(12) United States Patent
Runarvot et al.

(10) Patent No.: US 8,186,395 B2
(45) Date of Patent: May 29, 2012

(54) SYSTEM FOR FILLING A TANK

(75) Inventors: Herve Runarvot, Entrammes (FR); Philippe Dubois, Change (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 98 days.

(21) Appl. No.: 12/513,420

(22) PCT Filed: Nov. 6, 2007

(86) PCT No.: PCT/EP2007/061928
§ 371 (c)(1),
(2), (4) Date: May 4, 2009

(87) PCT Pub. No.: WO2008/055896
PCT Pub. Date: May 15, 2008

(65) Prior Publication Data
US 2010/0071807 A1    Mar. 25, 2010

(30) Foreign Application Priority Data
Nov. 8, 2006  (FR) ...................................... 06 09757

(51) Int. Cl.
*B65B 1/04*    (2006.01)
*B67C 3/00*    (2006.01)

(52) U.S. Cl. ........ 141/350; 141/349; 141/348; 141/352; 141/367

(58) Field of Classification Search .................. 141/301, 141/348–350, 352, 367; 220/86.2; 137/115.16
See application file for complete search history.

(56) References Cited

U.S. PATENT DOCUMENTS

| | | | | |
|---|---|---|---|---|
| 3,730,216 A | * | 5/1973 | Arnett et al. | 137/588 |
| 4,248,279 A | * | 2/1981 | Warmbold | 141/348 |
| 4,529,097 A | * | 7/1985 | Larson | 220/86.2 |
| 6,302,169 B1 | | 10/2001 | Pulos | |
| 6,382,270 B1 | | 5/2002 | Gzik | |
| 6,446,685 B2 | | 9/2002 | Stiegler et al. | |

(Continued)

FOREIGN PATENT DOCUMENTS
EP    1262355 A1    12/2002
(Continued)

OTHER PUBLICATIONS
PCT International Search Report dated for International Application No. PCT/EP2007/061928 (3 pp.), Jan. 21, 2008.

*Primary Examiner* — Dinh Nguyen
(74) *Attorney, Agent, or Firm* — Oblon, Spivak, McClelland, Maier & Neustadt, L.L.P.

(57) ABSTRACT

System for filling a tank comprising a fill pipe and a pipe head comprising an inlet valve and a moveable stopper in the head under the valve, characterized in that the valve comprises a peripheral part and a central part and in that only the peripheral part is coupled to the stopper and capable of causing the opening and/or unlocking of the latter under the pressure of a large-diameter fill nozzle, the central part being moveable with respect to this peripheral part so as to be able to swing under the action of a smaller-diameter fill nozzle, without acting on the stopper, while being connected to this same peripheral part so as to be entrained and swung with it under the pressure of a large-diameter fill nozzle.

11 Claims, 3 Drawing Sheets

U.S. PATENT DOCUMENTS

Figure 1:
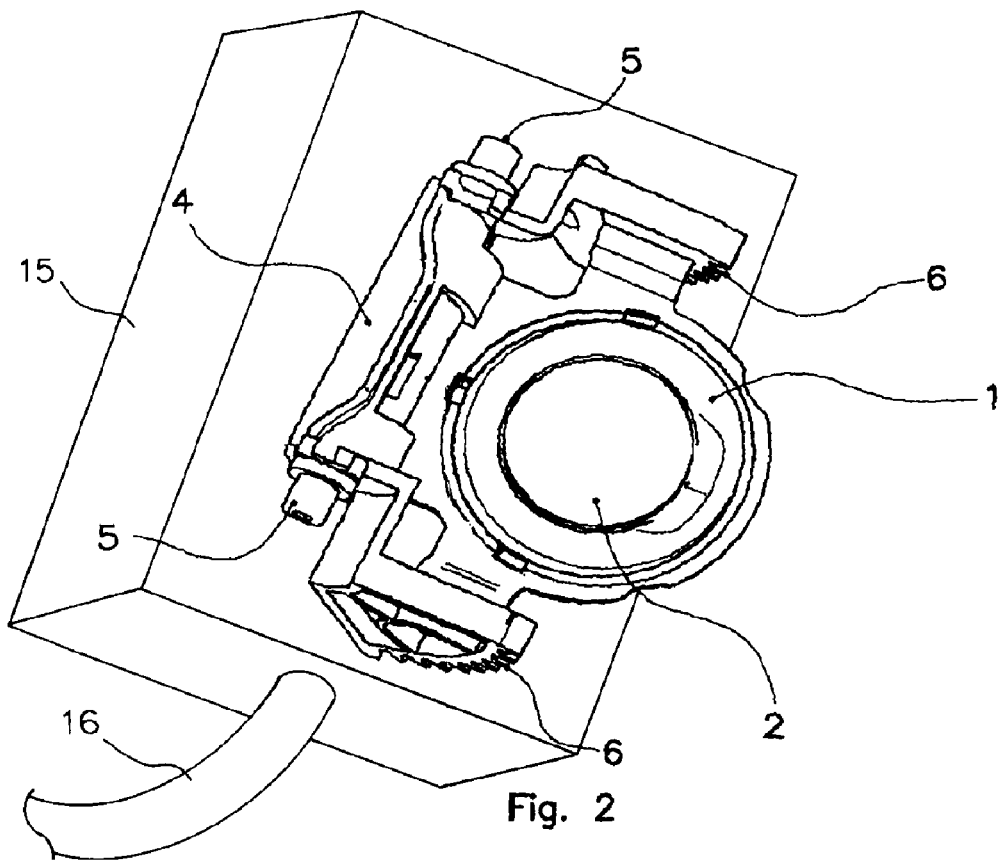

| | | |
|---|---|---|
| 6,968,874 B1 | 11/2005 | Gabbey et al. |
| 7,318,462 B2 | 1/2008 | Ganachaud |
| 2006/0032552 A1 | 2/2006 | Hedevang |
| 2007/0074785 A1 | 4/2007 | Ganachaud |

FOREIGN PATENT DOCUMENTS

| | | | |
|---|---|---|---|
| EP | 1262356 A1 | | 12/2002 |
| EP | 1262357 A1 | | 12/2002 |
| EP | 1284212 A1 | | 2/2003 |
| EP | 1625964 A2 | | 2/2006 |
| FR | 2710720 A1 | | 4/1995 |
| FR | 2861655 A1 | | 5/2005 |
| WO | WO 2005/049360 | * | 6/2005 |
| WO | WO2005077698 A1 | | 8/2005 |
| WO | WO2009007385 A1 | | 1/2009 |

\* cited by examiner

SYSTEM FOR FILLING A TANK

CROSS-REFERENCE TO RELATED APPLICATIONS

This application is a U.S. national stage application under 35 U.S.C. §371 of International Application No. PCT/EP2007/061928 filed Nov. 6, 2007, which claims priority to French Application No. 0609757 filed Nov. 8, 2006, these applications being incorporated herein by reference in their entirety for all purposes.

The present invention relates to a system for filling a tank, in particular a fuel tank.

The fill pipes present in fuel tanks, in particular the tanks aboard motor vehicles, are sealed during normal use of the tank, outside the filling periods. Sealing is generally performed by means of a cap that is introduced into the upper part of the pipe while transmitting a rotational movement thereto in order to close the pipe in a liquid-tight and gas-tight manner.

The operations of removing the cap before filling the tank, of replacing this cap and of closing the pipe after filling are most of the time carried out manually by the user. When the tank filling is finished, it may sometimes be forgotten to replace the cap and this then gives rise to the loss of this cap and to the pipe remaining open to the atmosphere for an indeterminate time. During this period, loss of liquid fuel occurs and vapours escape into the atmosphere.

For the purpose of preventing loss of the cap and contamination of the atmosphere which results therefrom, sealing systems integrated to the fill pipe, often called "capless" systems, have been proposed, replacing the traditional cap. Thus, for example, Application FR 2 861 655 in the name of the Applicant describes a pipe system with a chamber, arranged in which is a stopper that can be moved between an open position, in which the opening of the passage is aligned with the inlet and outlet openings of the chamber, and a closed position, in which the outlet opening is sealed. Such a pipe system has the advantage that the stopper is integrated into the pipe head and cannot be mislaid or forgotten. Moreover, an automatic opening and closing of the pipe head by introduction and withdrawal of a filling nozzle enables the task of the user to be made easier. This opening is made possible by axial pressure on an inlet valve connected to the stopper (which is in the form of a rotary slide valve) by a coupling member. Such a geometry favours automatic and leak-tight sealing without even using a seal.

Furthermore, for the purpose of preventing tanks from being filled with an unsuitable fuel that is capable of damaging the engine, nozzle inhibitor systems have been developed. To prevent a petrol tank from being filled with diesel, it is sufficient to provide an inlet opening with a small enough diameter (petrol pump nozzles having a standard nominal diameter of around 20.6 mm (described as small diameter in the present document) whereas diesel pump nozzles have a standard nominal diameter of 23.8 mm (described as large diameter in the present document)). On the other hand, the reverse (preventing petrol from being introduced into a diesel tank) is more complicated and generally involves the use of devices that are expensive (such as contact sensors: for example, see U.S. Pat. No. 6,382,270) and/or complicated to manufacture and install (such as release arms provided with hooks: for example, see U.S. Pat. No. 6,302,169).

However, for systems such as that described in the aforementioned Application FR 2 861 655 and where a pressure applied to a valve causes the opening and/or unlocking of a subjacent stopper, the Applicant has imagined a considerably simpler means of producing such a mistake-proofing effect. This means consists in dividing the valve into two concentric parts, of which only the peripheral part is coupled to the stopper and capable of causing the opening or unlocking of the latter under the pressure of a large-diameter fill nozzle (typically for diesel), the central part being moveable with respect to this peripheral part so as to be able to swing under the action of a smaller-diameter fill nozzle (typically for petrol), without acting on the stopper, while being connected to this same peripheral part so as to be entrained and swung with it when a larger-diameter nozzle comes to press against the latter.

Hence, the present invention relates to a system for filling a tank comprising a fill pipe and a pipe head comprising an inlet valve and a moveable stopper in the head under the valve, characterized in that the valve comprises a peripheral part and a central part and in that only the peripheral part is coupled to the stopper and capable of causing the opening and/or unlocking of the latter under the pressure of a large-diameter fill nozzle, the central part being moveable with respect to this peripheral part so as to be able to swing under the action of a smaller-diameter fill nozzle, without acting on the stopper, while being connected to this same peripheral part so as to be entrained and swung with it under the pressure of a large-diameter fill nozzle.

The present invention may be applied to any type of tank intended to be filled using an "automatic" filling nozzle (that stops automatically at the end of filling). It gives good results with fuel tanks.

In the device according to the invention, the tank is composed of a sealed chamber, the shape of which is not important. The tank should normally be produced from a material that is leaktight and chemically inert to the liquids for which it is intended, for example to the volatile liquid fuels derived from oil, used for motor vehicle propulsion. Examples of liquids that can be used in the tank to which the invention relates comprise fuels for supplying motor vehicle engines, in particular petrol and diesel, and organic liquids used as fuel or oxidant for supplying fuel cells intended to generate an electric current. Materials that can be used to produce the tank especially comprise metals (particularly steel) and plastics. Advantageously, polymers and copolymers derived from olefins, particularly ethylene, are used. Polyethylene, and in particular high-density polyethylene (HDPE), is especially recommended in the case of tanks intended for volatile liquid fuels derived from oil.

The wall of the tank may be composed of a single thermoplastic layer, or of two layers. One or more other possible additional layers may, advantageously, be composed of layers made of a barrier material to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolysed ethylene/vinyl acetate copolymer). Alternatively, the tank may be subjected to a surface treatment (fluorination or sulphonation) for the purpose of making it impermeable to the fuel.

The tank according to the invention preferably comprises an EVOH-based barrier layer located between the HDPE-based outer layers.

The filling system according to the invention comprises a fill pipe and a pipe head preferably comprising an inlet opening sealed by a pivoting valve, an outlet opening and a stopper that can be moved in said head. This valve may have any shape. However, given that the inlet and outlet openings of the head are generally circular, it is generally a circular plate.

Preferably, the possible and preferred constituent materials for the pipe, head, valve and stopper are plastics. Polyamides (preferably reinforced, with glass or carbon fibres for example) and polyacetals (such as POM, or polyoxymethylene) give good results.

According to the invention, the inlet valve comprises two concentric parts connected together so that the movement of the peripheral part conditions the opening/unlocking of the stopper, the central part being moveable with respect to this peripheral part but swinging with it when this peripheral part pivots with respect to its closed position. One particularly suitable means for obtaining such a connection consists in making the peripheral part pivot/swing about an axle attached to the pipe head and to make the central part swing or move about an axle attached to the peripheral part. Pivoting/swinging gives good results.

In the preceding paragraphs, the term "pivoting/swinging" is in fact understood to mean a rotational movement about an axle which hence is preferably located at one end (in the vicinity of a tangent to the circumference) of the valve. To allow such a movement, the central and peripheral parts of the valve are preferably provided with at least one recess through which the axle is inserted. This movement is preferably possible only towards the inside of the head. In order to do this, it is possible to provide a shoulder on the central part and to mount this part underneath the axle.

According to one preferred variant, the axles of the central part and the peripheral part of the valve are diametrically opposed so that the user can more easily detect an anomaly (the swing direction of the two parts being reversed).

Most particularly preferably, by default (i.e. at rest, when no pipe acts on the valve) the parts of the valve are kept in their closed position (i.e. pushed upwards) using a suitable device. A device which is particularly suitable for this purpose is a prestressed spring or a part that can be deformed within the limit of its elastic stresses.

Any stopper may be used for the system according to the invention. It may, for example, be a second pivoting valve sealing the outlet opening of the head, and the movement of which is either allowed or blocked depending on whether the peripheral part of the inlet valve has or has not pivoted into its open position. In this variant, the peripheral part of the inlet valve may, for example, act on an actuator that respectively allows the movement of the second pivoting valve to be (un)locked.

According to another variant, which is preferred, the stopper is a rotary slide valve such as described in the aforementioned Application FR 2 861 655 and of which the content is, for this purpose, incorporated by reference in the present application. In this variant, the peripheral part of the inlet valve is connected to the slide valve by a coupling member so that a pressure exerted on this part of the valve by a large-diameter tubular nozzle causes the valve to swing in the fill head and the slide valve to rotate, placing a cylindrical opening of said slide valve in alignment with the inlet and outlet openings of the head.

In one particular embodiment, the coupling member comprises two engaged pinions, one of the pinions being attached to the slide valve and the other pinion being attached to the peripheral part of the valve. In this embodiment, the rotation of the peripheral part of the valve about its pivot automatically causes a corresponding rotation of the slide valve in the pipe head, via the two pinions. In that way, a pressure exerted on the peripheral part of the valve with a large-diameter fill nozzle indeed causes the peripheral part of the valve to swing in the head and the slide valve to rotate, placing a cylindrical opening of said slide valve in alignment with the inlet and outlet openings of the head.

Figure 4:
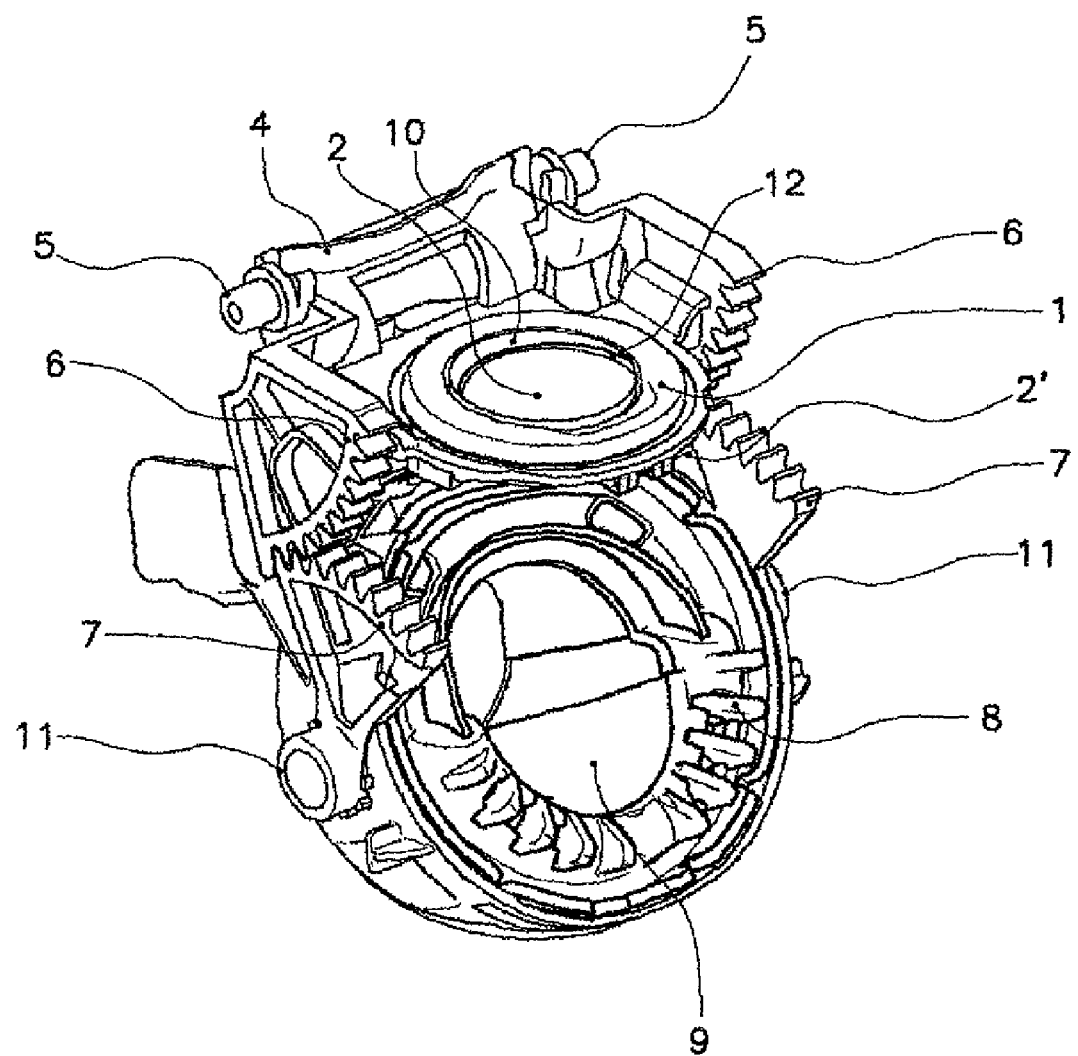

This "rotary slide valve" variant gives good results when the swing direction of the central part of the valve is such that said part comes to rest against the slide valve when it swings towards the inside of the pipe. This is because this stop limits the penetration of a fill nozzle into the fill pipe in case of an incorrect choice of fuel. This is illustrated by FIG. 4 appended to the present document.

In the device according to the invention, it is often advantageous to provide a locking mechanism which may be operated directly (in proximity to said mechanism) or from the passenger compartment of the vehicle, and which prevents access to the tank, for example by blocking the movement of the peripheral part of the inlet valve. Blocking and unblocking this part of the valve may be carried out manually or via an electric motor or an actuator (a kind of cylinder actuator) controlled electrically, electromagnetically or manually.

This locking system may be combined with locking of the vehicle doors, for example. Such a system makes it possible to effectively tackle the theft-proofing of the system. Moreover, the opening, closing and locking functions brought together in one and the same part create a substantial cost saving and facilitate the assembly onto the vehicle.

Usually, on the vehicles, mainly for aesthetic reasons, a flap masks the fuel inlet circuit and has central locking. With the locking system according to the advantageous variant described above, the flap should no longer be provided with a locking function and may then be opened manually, which allows, for example, the bowl to be cleaned using a pressure washer.

Figure 2:
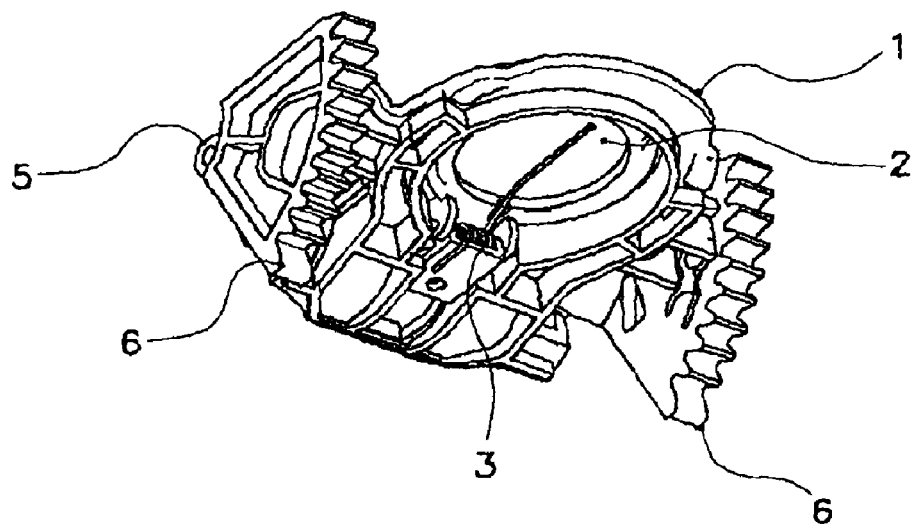
Figure 3:
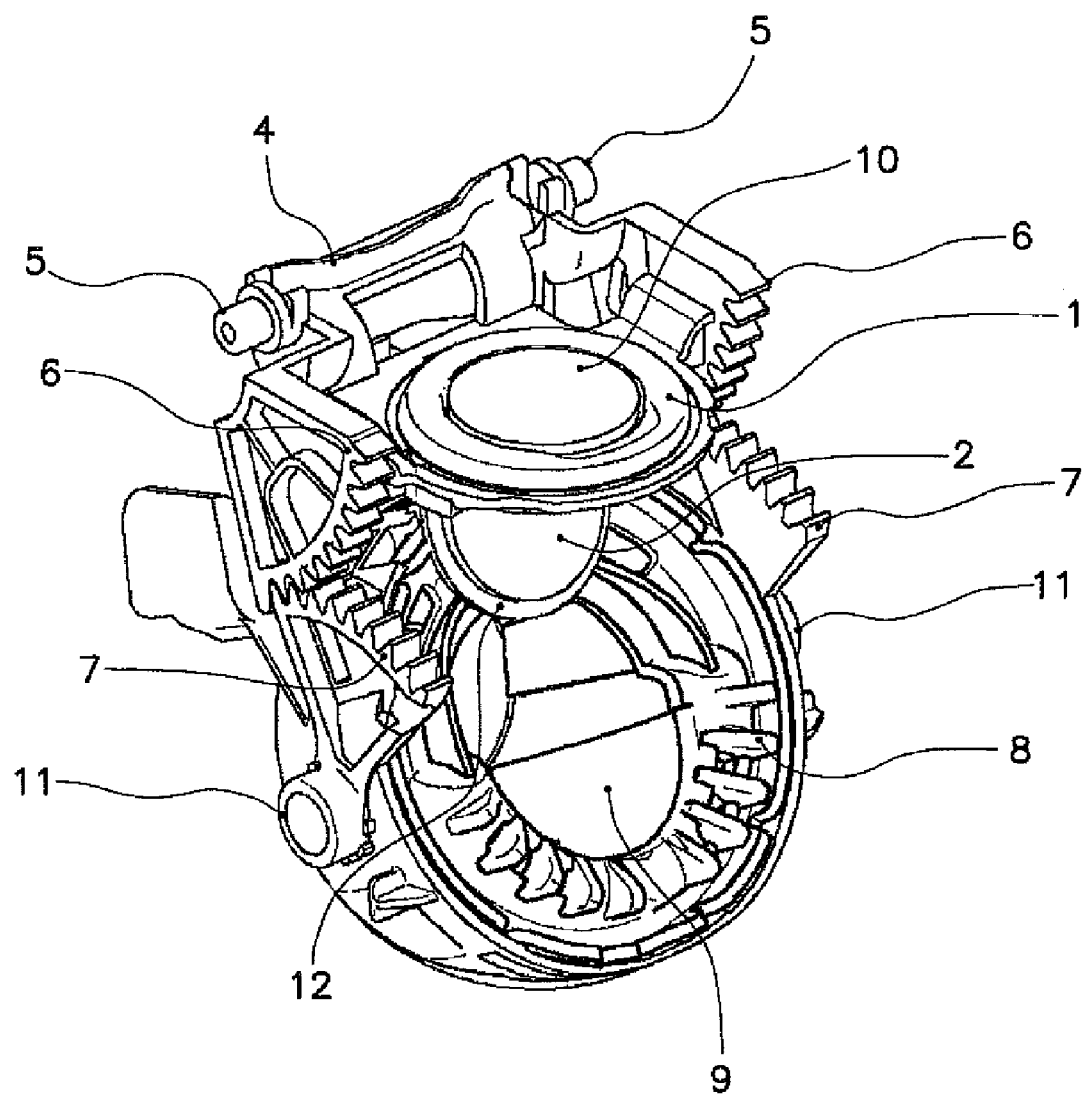

Other particularities and features of the invention will appear from the description of an advantageous embodiment given below, by way of illustration, with reference to the appended drawings which show:

FIG. 1: a top view of the upper part of a system according to one variant of the invention in its completely closed position;

FIG. 2: a bottom view of this same upper part in the same position;

FIG. 3: a front/side view of this same upper part but in its open position of the central part of the valve and closed position of its peripheral part, and completed by a rotary slide valve such as described previously and illustrating the coupling mechanism between the peripheral part of the valve and said slide valve; and FIG. 4: a similar view to that of FIG. 3, but illustrating a slightly different variant.

As regards the part of the system located underneath the parts illustrated in these figures, reference is again made to Application FR 2 861 655, the content of which is, for this purpose, incorporated by reference in the present application.

In these figures, identical components bear identical numbers. A valve can be seen therein that comprises a peripheral part (1) and a central part (2) kept at rest against the previous part by a torsion spring (3) only visible in FIG. 2. A similar device (not shown) acts on the peripheral part to keep it at rest in its closed position illustrated in all these figures.

The peripheral part (1) of the valve is provided with an excrescence (4) comprising cylindrical recesses (5) for a pivoting/swinging axle (not shown) attached to the head 15. A fill pipe 16 is also included for filling a tank. It is also provided with a pair of pinions (6) complementary to a pair of pinions (7) attached to the slide valve (8) and only visible in FIG. 3, just like the slide valve itself. This valve (8) comprises a cylindrical opening (9), of which the ends are intended to align (position not illustrated), or not to align, with the inlet and outlet openings of the fill head. The latter are (just like the head itself) not illustrated in the figures, but they are substantially parallel and run straight on from the opening (10) made in the valve by swinging of its central part (2).

The slide valve (8) also comprises excrescences (11) that make it possible to ensure its rotation in the head.

To pass from the completely closed position illustrated in FIGS. 1 and 2 to the position illustrated in FIG. 3, a pressure was exerted (for example, using a "petrol" fill pipe) on the central part (2) of the valve only, thus causing it to swing into its open position. However, as the peripheral part (1) of the valve has not swung, its pinions (6) have not interacted with (turned) the pinions (7) of the slide valve (8) and therefore, the cylindrical opening of the slide valve (8) is not aligned with the opening (10) and the fill tube cannot be inserted properly into the head.

To obtain a completely open position (not illustrated), it would have been necessary to exert a pressure on the peripheral part (1) of the valve (for example, using a "diesel" fill nozzle") and by doing so, turning the pinions (6, 7) so as to straighten up the slide valve (8) and align its cylindrical opening (9) with the inlet and outlet openings of the head. Such a pressure would, of course, have also entrained the central part (2) of the valve, this central part which can only move downwards with respect to the peripheral part due to the presence of a sealing lip (12) that has a diameter greater than the opening (10).

In order to prevent an inopportune opening in case of off-centred pressure with a petrol nozzle (i.e. by pushing on the central part and the peripheral part at the same time), it is possible to provide the peripheral part with gradients that guide the nozzle towards the middle.

FIG. 4 illustrates a variant that is slightly different to that of the other figures. In fact, the difference lies in the position of the swinging axle (2') of the central part (2) of the valve, which is diametrically opposed to that illustrated in the other figures. The advantage is that, through the orientation of the subjacent slide valve (8), the central part (2) of the valve cannot completely swing inside the pipe and hence that the nozzle cannot quite penetrate into the pipe. Moreover, the user notices an anomaly more easily as the swing direction is reversed with respect to that of the peripheral part (1) of the valve, and therefore with respect to that of a normal situation.

The invention claimed is:

1. A system for filling a fuel tank comprising coupled with a fill pipe and a pipe head comprising:
    an inlet valve; and
    a moveable stopper in the pipe head under the inlet valve, wherein said inlet valve includes a peripheral part and an inlet configured to be sealed by a rotatable central part coupled to the peripheral part, the peripheral part being coupled to the moveable stopper and configured to cause at least one of an opening and unlocking of the stopper when a pressure is applied to a top surface of the peripheral part,
    wherein the central part is rotatable with respect to the peripheral part to an open position when a pressure is applied to the central part, without acting on the moveable stopper, and
    wherein when the pressure is applied to a top surface of the peripheral part, the central part while being connected to the peripheral part is rotatable along with the peripheral part due to the pressure applied to the top surface.

2. The system according to claim 1, wherein the peripheral part of the inlet valve is configured to swing about an axle attached to the pipe head, and wherein the central part of the inlet valve is configured to swing about an axle attached to the peripheral part of the inlet valve.

3. The system according to claim 2, wherein the central and peripheral parts of the inlet valve are configured to only swing about their respective axle towards the inside of the pipe head.

4. The system according to claim 2, wherein the peripheral and central parts of the inlet valve are kept, by default, in their closed position by a prestressed spring.

5. The system according to claim 1, wherein the moveable stopper is a second pivoting valve, the movement of which is either allowed or blocked depending on whether the peripheral part of the inlet valve has or has not pivoted into its open position.

6. The system according to claim 5, wherein the peripheral part of the inlet valve acts on an actuator that allows the movement of the second pivoting valve to be locked or unlocked.

7. The system according to claim 1, wherein the pipe head includes an inlet opening and an outlet opening, and wherein the moveable stopper is a rotary slide valve connected to the peripheral part of the inlet valve by a coupling member so that a pressure exerted on this peripheral part of the inlet valve causes the inlet valve to swing in the pipe head and the slide valve to rotate, placing a cylindrical opening of said slide valve in alignment with the inlet and outlet openings of the pipe head.

8. The system according to claim 7, wherein the coupling member includes two engaged pinions, one of the pinions being attached to the slide valve and the other pinion being attached to the peripheral part of the inlet valve.

9. The system according to claim 1, further comprising a locking mechanism that prevents access to the tank by blocking the movement of the peripheral part of the inlet valve.

10. The system according to claim 2, wherein the axles of the central part and the peripheral part of the inlet valve are diametrically opposed.

11. A fuel tank equipped with the system according to claim 1.

* * * * *